United States Patent
Jacobsen

(10) Patent No.: US 10,121,035 B2
(45) Date of Patent: Nov. 6, 2018

(54) METHOD OF IDENTIFICATION OF A TAG ON A MOVING ITEM

(71) Applicant: LYNGSOE SYSTEMS A/S, Aars (DK)

(72) Inventor: Klaus Holst Jacobsen, Aars (DK)

(73) Assignee: LYNGSOE SYSTEMS A/S (DK)

( * ) Notice: Subject to any disclaimer, the term of this patent is extended or adjusted under 35 U.S.C. 154(b) by 0 days.

(21) Appl. No.: 15/542,780

(22) PCT Filed: Jan. 14, 2015

(86) PCT No.: PCT/DK2015/050008
§ 371 (c)(1),
(2) Date: Jul. 11, 2017

(87) PCT Pub. No.: WO2016/112911
PCT Pub. Date: Jul. 21, 2016

(65) Prior Publication Data
US 2018/0004992 A1    Jan. 4, 2018

(51) Int. Cl.
*G06K 13/06*   (2006.01)
*G06K 13/24*   (2006.01)
(Continued)

(52) U.S. Cl.
CPC ......... *G06K 7/10445* (2013.01); *B65G 43/08* (2013.01); *G06K 7/10336* (2013.01);
(Continued)

(58) Field of Classification Search
USPC .................................. 235/385, 483, 375, 383
See application file for complete search history.

(56) References Cited

U.S. PATENT DOCUMENTS 5,689,239 A    11/1997   Turner et al.
5,793,305 A    8/1998    Turner
(Continued)

FOREIGN PATENT DOCUMENTS

EP    2154552 A1    2/2010
EP    2533173 A1    12/2012
WO    2009002156 A1    12/2008

OTHER PUBLICATIONS

International Search Report PCT/DK2015/050008; 4 pgs.
(Continued)

*Primary Examiner* — Tuyen K Vo
(74) *Attorney, Agent, or Firm* — Schmeiser, Olsen & Watts, LLP

(57) ABSTRACT

A method and system for identification of an item is provided, wherein the system includes a conveyor belt, a positioning device and a reader operable to receive at least one reading at at least one first antenna from at least one tag attached to the item, the first antenna being adapted to be arranged at a read point along the conveyor belt, wherein the positioning device is configured to retrieve a first position of the item at a first time instant before the first antenna and a second position of the item at a second time instant after the first antenna, the first and second time instants defining a time window, wherein the reader is configured to extract from each reading retrieved by the first antenna a measurement (6) of the phase of the signal transmitted by the tag (5) and perform a data processing of the phase measurements whereby the identification of the item (2) is accomplished.

8 Claims, 4 Drawing Sheets

Figure 1:
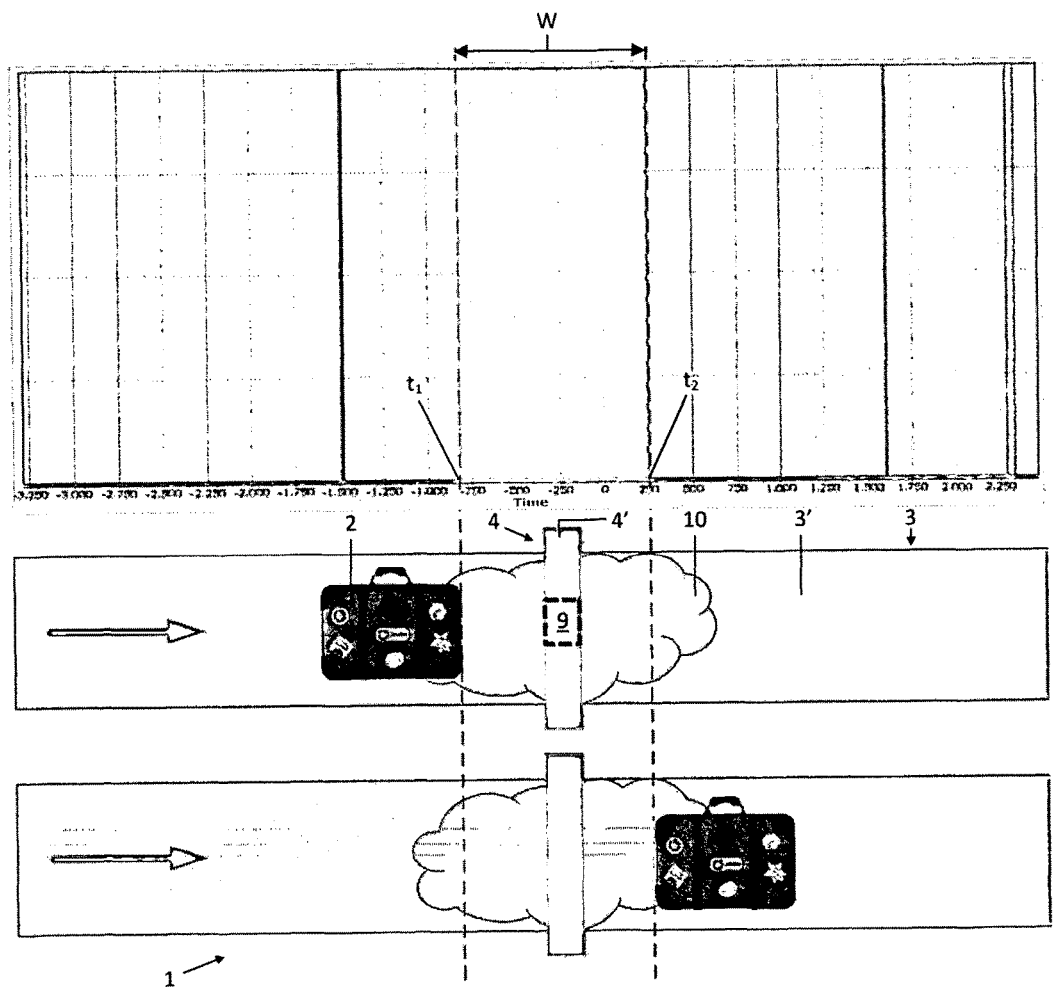

(51) Int. Cl.
*G06K 7/10* (2006.01)
*G06K 19/07* (2006.01)
*B65G 43/08* (2006.01)
*B65G 15/28* (2006.01)

(52) U.S. Cl.
CPC .......... *G06K 19/0723* (2013.01); *B65G 15/28* (2013.01); *B65G 2201/0264* (2013.01); *G06K 2007/10504* (2013.01)

(56) References Cited

U.S. PATENT DOCUMENTS

| | | | |
|---|---|---|---|
| 2005/0280504 A1* | 12/2005 | Pettus | G06K 19/0672 340/10.1 |
| 2007/0030150 A1 | 2/2007 | Mullins | |
| 2007/0075866 A1* | 4/2007 | Hohler | G06K 7/10336 340/572.7 |
| 2008/0266097 A1* | 10/2008 | Lee | H04B 17/27 340/572.1 |
| 2010/0328073 A1 | 12/2010 | Nikitin et al. | |
| 2011/0001621 A1* | 1/2011 | Iwahashi | G01S 13/04 340/572.7 |
| 2011/0050421 A1* | 3/2011 | Duron | G01S 13/589 340/572.1 |
| 2012/0098643 A1* | 4/2012 | Gunther | G06K 7/10356 340/10.1 |
| 2013/0201003 A1* | 8/2013 | Sabesan | G01S 7/42 340/10.1 |
| 2017/0372106 A1 | 12/2017 | Wilkinson | |

OTHER PUBLICATIONS

Written Opinion PCT/DK2015/050008; 5 pgs.
Third party observation for European Application No. EP3245610A1—Applicant: Lyngsoe Systems A/S.

* cited by examiner

METHOD OF IDENTIFICATION OF A TAG ON A MOVING ITEM

CROSS-REFERENCE TO RELATED APPLICATIONS

This application claims priority to PCT Application No. PCT/DK2015/050008 having a filing date of Jan. 14, 2015, the entire contents of which is hereby incorporated by reference.

FIELD OF TECHNOLOGY

The following relates to the technical field of item identification, particularly to identification of moving items.

BACKGROUND

Item identification may be performed, for example, in case of tracking and routing a passenger bag within airport premises, by installing read points through which the conveyor belt transporting that bag run. Conventional read points typically use the received signal strength indicator (RSSI) to determine which bag tag is attached to the bag. However, the latter is a very unreliable type of measurement, which depends on numerous factors such as the propagation environment, the quality of the tag and the antenna, the consistency in the quality of the tag, etc. As a consequence, the probability of misidentification is high. In order to alleviate this problem, shielding panels and RF absorbing panels may be installed by the read point to ensure that readings only from the bag tag on the item moving past the antenna are received. However, this implies a higher infrastructure cost.

Hence, there is a long-felt need in the technical field of item identification of overcoming the abovementioned drawbacks of the state-of-the-art solutions.

SUMMARY

An aspect relates to an improvement to the state-of-the-art. The second aspect of the invention is to solve the aforementioned drawbacks of the known art by providing a highly accurate and reliable item identification system without increasing the cost of the infrastructure.

The aspects of the embodiments of the invention are achieved by a system for identification of an item (e.g., a suitcase, a bag, a package, etc.), wherein the system comprises a conveyor belt, a positioning means or positioning device (e.g., a conveyor belt controller such as a PLC or a pair of photoelectric sensors) and a reader (e.g., an RF reader such as an RFID reader) operable to receive at least one reading at at least one first antenna from at least one tag (e.g., a self-adhesive label embedding an RFID tag) attached to the item (e.g., at the handle of a suitcase), the first antenna (e.g., an RFID antenna) being adapted to be arranged at a read point along the conveyor belt (e.g., underneath the topside and/or at one or both lateral sides of an opening of a wall, a gate, a portal, etc. through which the conveyor belt runs), wherein the positioning means or device is configured to retrieve a first position of the item at a first time instant before the first antenna and a second position of the item at a second time instant after the first antenna, the first and second time instants defining a (configurable) time window, wherein the reader is configured to extract (e.g., by means of signal processing techniques) from each reading retrieved by the first antenna a measurement of the phase (e.g., an estimate of the phase change over time) of the signal (e.g., an RF signal) transmitted by the tag and perform a data processing of the phase measurements, which data processing comprises constructing a phase curve from the phase measurements and determining a global maximum on the phase curve, wherein the reader is configured to associate the tag to the item if the global maximum lies within the time window, whereby the identification of the item (i.e., the association of the tag to the item and consequently to the travel information of the passenger) is accomplished.

Herein, "RFID" is referred to any technology that uses RF signals for communication and/or identification purposes such as UHFGen2.

A reading may, for example, comprise: the time when the signal has been received at the reader (i.e., the timestamp), the RSSI, the phase value of the received signal and information about the communication channel. As well as the RSSI, the derivative of the phase value provides information on the change in distance between the antenna and the item.

The embodiments of the invention have the following advantages: (i) it is independent of the signal strength; (ii) it does not result in any misidentification error; and (iii) it is very precise and reliable. Also, there is no need to continuously track the items (e.g., by the conveyor belt controller), but just to install antennas in strategic points along the way, e.g., where the item shall be moved from one conveyor belt to another conveyor belt or where the item shall be x-ray scanned so that the result of the scanning can be associated to the item in a database or where the item shall be routed towards a specific destination (e.g., a flight).

Theoretically, the power of the reader could be even increased up to its maximum in order to get as many measurements for the same item as possible (e.g., 3-4 m before/after the first antenna) while not influencing the retrieved phase values. If RSS measurements would be used, instead, the higher the power of the reader the more difficult would be to filter the data and perform the identification. Hence, the embodiments of the invention have the additional advantage of enabling a more accurate item identification while being able to increase radio emissions for better signal reception.

Advantageously, the first antenna of the reader may be placed with an equal distance from the first position of the item at the first time instant and the second position of the item at the second time instant, so as to maximize the probability of reading the tag both when the tag is approaching the read point and when the tag is moving away from the read point after having moved past it. Moreover, the first antenna may be arranged so as to be as close as possible to the items moving past it, whereby the readings retrieved by the first antenna have the highest received signal strength possible. Therefore, RSSI may be used in combination with embodiments of the invention in order to filter the phase measurements, for example, by discarding phase measurements with a received signal strength under a threshold (e.g., −55 dBm).

A phase reconstruction generates a non-periodic curve from the phase measurements, which have a periodicity of 360 degrees (actually, depending on the reader used, they may also be represented with a periodicity of 180 degrees). The global maximum in the curve representing the reconstructed phase (referred to as the phase curve) denotes the time when the tag is approximately by the first antenna of the reader.

Due to the physics and the position of the first antenna, the latter has a coverage of, for example, a few meters (e.g., before and after its nadir), and therefore may retrieve data from a number of tags (e.g., tags from items before/after the item to identify), not only from the desired one. Thus, there might be many phase measurements falling within the time window not belonging to the tag attached to the item to be identified. Nevertheless, the system is able to discard all the tags that do not belong to the item in question by constructing the phase curve and determining that the global maximum does not fall within the time window.

Hence, this data processing is beneficial, for example, in case of many readings from many different tags within the time window, so as to more easily be able to identify the pattern of each tag and filter out the irrelevant tags.

In an advantageous embodiment of the invention, the reader is configured to construct the phase curve by detecting period roll overs of the phase measurements (e.g., when the phase value shifts from the maximum of the period, such as 180 or 360 degrees, to the minimum of the period, such as 0 degrees, or vice versa) and adding period fragments.

In an advantageous embodiment of the invention, the reader is further configured to compare the speed related to consecutive constructed phase measurements (calculated from the phase and time values) to the speed of the conveyor belt (e.g., 2 m/s) and accordingly filter out constructed phase measurements lying too far from each other.

In an advantageous embodiment of the invention, the reader is further configured to verify the global maximum by defining an interval along the constructed phase curve around the global maximum (e.g., 2 sec before and after the global maximum), calculating a decline (i.e., a phase difference) before and after the global maximum, and comparing the calculated declines to a threshold (e.g., depending on the speed of the conveyor belt and the height of the first antenna). For example, the threshold may be within the range of 100-500 degrees for a conveyor belt that runs at 2 m/sec.

Note that, in case the phase measurements of a tag do not change but remain constant during the time window, the system can infer that the tag is not moving and is not attached to the item (e.g., if it has fallen on the floor by the side of the conveyor belt). The system would then be able to filter out those tags not matching the movement pattern of the item. Hence, embodiments of the invention has the further advantage of enabling the detection of such situations and, optionally, of subsequently alerting the user (e.g., a passenger) or an operator (e.g., an airport clerk).

In an advantageous embodiment of the invention, the reader further comprises at least one second antenna (e.g., an RFID antenna) adapted to be placed underneath an upper surface of the conveyor belt, wherein the reader is configured to associate the tag to the item if at least one reading (e.g., 80% of the readings) has been retrieved from the second antenna for the tag within the time window. Note that, in case the second antenna is placed by the same read point along the conveyor belt where the first antenna is placed, the time window is the same for both antennas. Otherwise, each antenna may have its own time window representing the time interval spanning from a time instant before the antenna to a time instant after the antenna.

Advantageously, another unit in the system (e.g., a local server) rather than the reader may perform the extraction of the phase measurements from the readings and/or the association of the tag to the item and/or the comparison of the phase measurements to the threshold and/or the data processing.

Also, the aforementioned aspects of the embodiments of the invention are achieved by a method of identification of an item, wherein the method comprises:

providing a system as described above;
the reader receiving one or more readings from the tag;
the positioning means retrieving the position of the item at the first time instant before the first antenna and at the second time instant after the first antenna, the first and second time instants defining a time window;
the reader extracting from each reading retrieved by the first antenna a measurement of the phase of the signal transmitted by the tag;
the reader performing a data processing of the phase measurements, which data processing comprises constructing a phase curve from the phase measurements and determining a global maximum on the phase curve; and
the reader associating the tag to the item if the global maximum lies within the time window; whereby the identification of the item is accomplished.

In an advantageous embodiment of the invention, the method further comprises constructing the phase curve by detecting period roll overs of the phase measurements and adding period fragments.

In an advantageous embodiment of the invention, the method further comprises comparing the speed related to consecutive constructed phase measurements to the speed of the conveyor belt and accordingly filtering out constructed phase measurements lying too far from each other.

In an advantageous embodiment of the invention, the method further comprises verifying the global maximum by defining an interval along the constructed phase curve around the global maximum, calculating a decline before and after the global maximum, and comparing the calculated declines to a threshold.

In an advantageous embodiment of the invention, the method further comprises:
providing a system as described above;
the reader associating the tag to the item if at least one reading has been retrieved from the second antenna for the tag within the time window.

Note that the steps of the method do not necessarily need to be carried out in the order described above but may also be performed in a different order and/or simultaneously.

Note that all the aforementioned advantages of the system are also met by the method described above.

BRIEF DESCRIPTION

Figure 2:
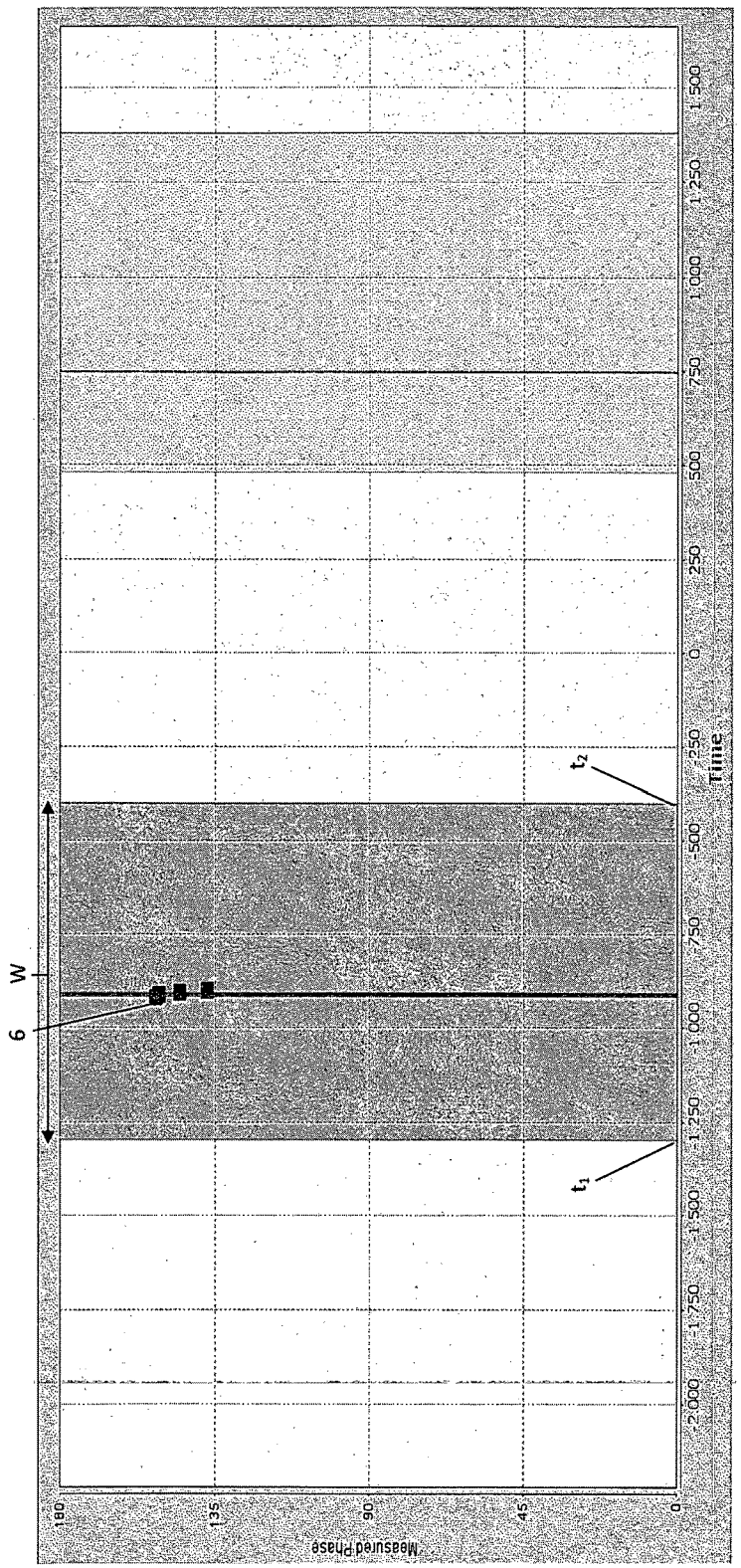
Figure 3:
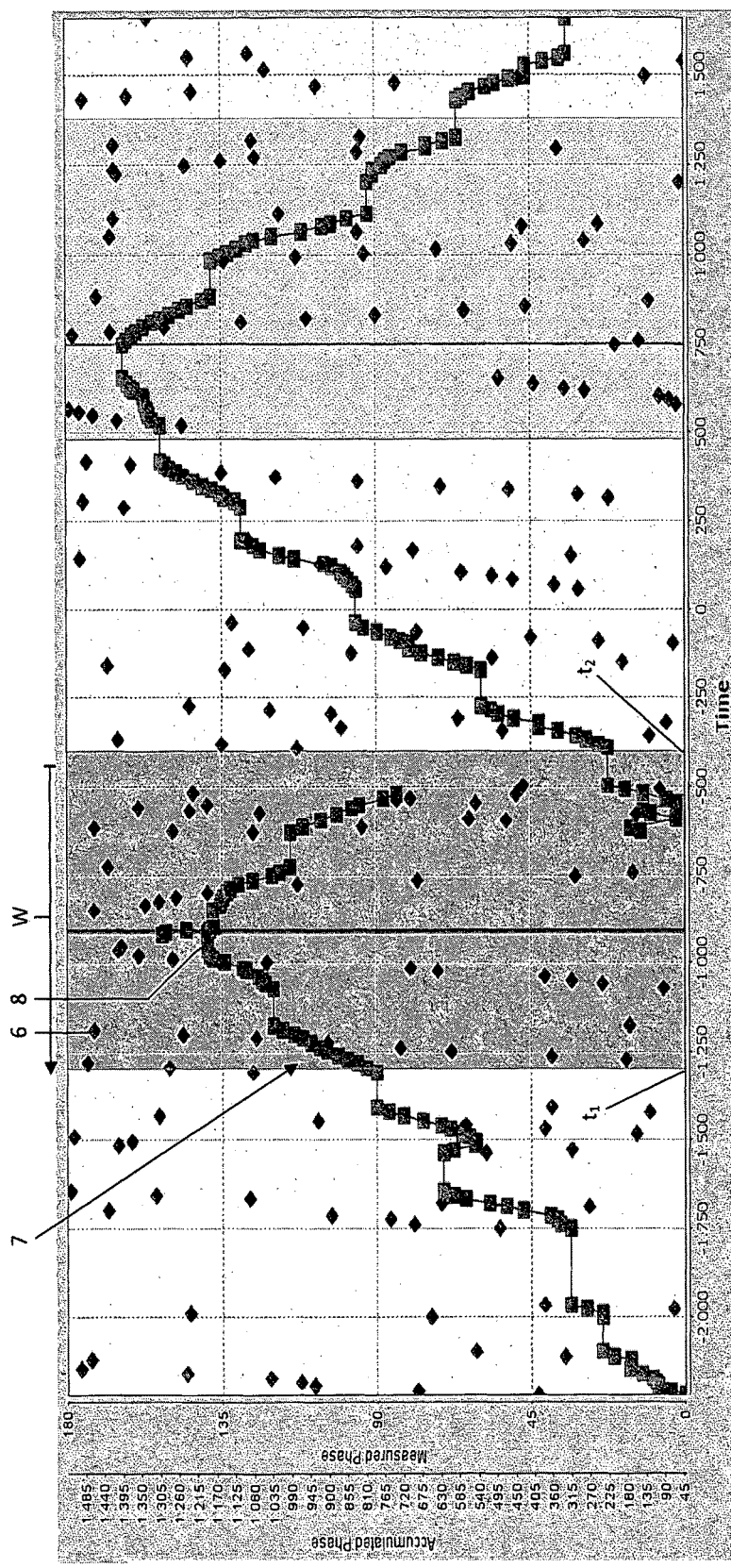

Some of the embodiments will be described in detail, with reference to the following figures, wherein like designations denote like members, wherein:

FIG. 1: depicts a top view of a Conveyor belt reader;
FIG. 2: depicts a snapshot of phase measurements plotted against time for the first antenna;
FIG. 3: depicts a snapshot of two reconstructed phase curves; and
FIG. 4: is a method of item identification according to embodiments of the invention.

NOTATIONS

1: Conveyor belt reader.
2: Item.
3: Conveyor belt.
3': Upper surface of the conveyor belt.
4: Read point.
4': Topside of the read point.
5: Tag.
6: Measurement.
7: Phase curve.

8: Global maximum.
9: First antenna.
10: Coverage of the first antenna.
$t_1$: First time instant.
$t_2$: Second time instant.
W: Time window.

DETAILED DESCRIPTION

FIG. 1 shows an advantageous embodiment of a system 1 for identification of an item 2 in the form of a conveyor belt reader 1 in an airport. Note, however, that the system 1 of the invention is not limited to be used as a conveyor belt reader 1 within airport premises, but can also be used for other applications such as in a postal distribution central or a retail distribution center for sorting packages.

A suitcase 2 is transported on a conveyor belt 3, which runs through a read point 4 in the direction of the arrow. The conveyor belt 3 has an RFID antenna (the second antenna) of an RFID reader placed underneath its upper surface 3' (not shown in FIG. 1) and the read point 4 has an RFID antenna 9 (the first antenna 9) of the RFID reader placed underneath its topside 4'. The first antenna 9 retrieves readings within its coverage 10, in particular from an RFID tag attached to the suitcase 2 (not shown in FIG. 1).

The printer at the check-in codes the relevant information in the RFID tag, which is printed together and embedded in the bag tag 5 to apply to the suitcase 2. The 10 digits code, which is encoded in the barcode on the bag tag 5, is also encoded in the RFID tag via the RFID antenna at the printer.

A PLC (Programmable Logic Controller) is a low level controller, which makes the conveyor belt 3 run/stop and which tracks the bags 5 by means of photocells positioned along the conveyor belt 3.

The conveyor belt controller knows the first time instant $t_1$ when the suitcase 2 is at a first check-point before the read point 4 (e.g., it may be where a first photocell of the PLC is placed or where the PLC expected the suitcase 2 to be at that time instant) and the second time instant $t_2$ when the suitcase 2 is at a second check-point after the read point 4 (e.g., it may be where a second photocell of the PLC is placed or where the PLC expected the suitcase 2 to be at that time instant). For example, the first and second check-points may be around 1 m before and after the read point 4 (i.e., before and after both the first and second antennas). When the suitcase 2 has run through the read point 4, the conveyor belt controller may inform the reader that at the first time instant $t_1$ the suitcase 2 was at the first check-point and at the second time instant $t_2$ the suitcase 2 was at the second check-point.

Figure 4:
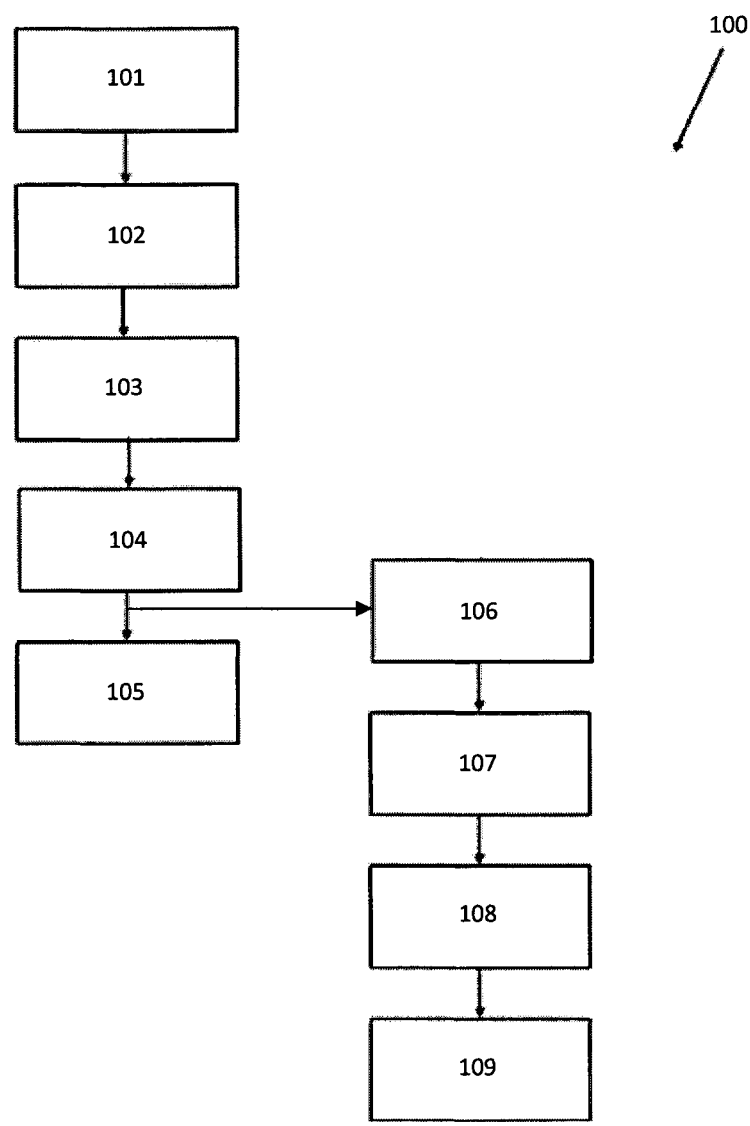

The exemplary identification method 100 (ref. FIG. 4) carried out in this embodiment mainly comprises two steps. First, it is checked whether there is at least one reading from the second antenna falling within the time window W, which is defined by the time interval between $t_1$ and $t_2$. If so, it is concluded that the bag tag 5 sat on that suitcase 2. Note that, especially in case of items 2 where the bag tag 5 hangs on the side or gets underneath the underside of the item 2 when the latter is placed on the conveyor belt 3, it may be difficult to retrieve data from the first antenna 9. If not (e.g., the bag tag 5 sat on the top of the item 2 and the second antenna could not receive signal from it or there are no readings during the time interval in which the second antenna is switched on), a phase curve 7 is constructed from the phase measurements 6 retrieved by the first antenna 9 and the global maximum 8 of the phase curve 7 is determined. The global maximum 8 represents the time instant when the bag tag 5 has essentially passed underneath the first antenna 9.

The reader then associates that bag tag 5 to the suitcase 2 if the global maximum 8 lies within the time window W. After the identification has been performed, the information concerning which bag tag 5 sits on that suitcase 2 is passed back to the conveyor belt controller, which continues to track and route the suitcase 2 onwards.

FIG. 2 shows measured phase values 6 in degrees against time in ms for the bag tags 5 under coverage of the second antenna. The latter may have a confined coverage such that it may retrieve signals only when the suitcase 2 travels in proximity of its zenith (the solid line approximately in the middle of the time window W). Consequently, the reader may not receive signals from other items 2 lying before, after or on the side of the second antenna (e.g., 40 cm from it), thus there may be no need to construct the phase curve 7 as with the phase measurements 6 retrieved by the first antenna 9, but only to check whether the timestamps of the reading fall within the time window W; if so, the bag tag 5 is associated to the suitcase 2.

The second antenna may be displaced with respect to the nadir of the first antenna 9 (e.g., slightly before it), as the second antenna has to be inserted underneath the upper surface 3' of the conveyor belt 3, basically where there is space to place it. Hence, the readings got from the second antenna may be offset with respect to the middle of the time window W. Nevertheless, the offset is known by the reader, which can therefore subtract it from the timestamps of the readings.

FIG. 3 shows measured phase values 6 in degrees against time in ms for the bag tags 5 under coverage of both the first antenna 9 and the second antenna. With respect to the second antenna, which in this embodiment has a confined coverage, the first antenna 10 has a broader coverage and therefore retrieves many more readings, for example, due to other items 2 lying before, after or on the side of the first antenna 9. As it is noticeable from the phase curve 7, the phase measurements 6 have a periodicity between 0 and 180 degrees, and the constructed phase curve 7 increases/decreases the closer/farther the suitcase 2 is with respect to the first antenna 9, reaching its peak (i.e., the global maximum 8) approximately when the suitcase 2 is at the nadir of the first antenna 9.

Note that there may be periods with no readings if the first antenna 9 and the second antenna switch between each other and do not transmit simultaneously. For example, the first antenna 9 may transmit for around 150 ms and then the second antenna for around 50 ms. In other cases, it may be possible that the suitcase 2 is stopped until it can be moved from a first conveyor belt to a second conveyor belt, where it is, e.g., accelerated into an empty wagon for transporting it forward through the read point 4, thus a plateau for the phase values 6 can be observed right before the global maximum 8.

FIG. 4 shows a method 100 of identification of an item 2, wherein the method 100 comprises:
providing 101 a system 1 as described above;
the reader receiving 102 one or more readings from the tag 5;
the reader extracting 103 from each reading retrieved by the first antenna 9 a measurement 6 of the phase of the signal transmitted by the tag 5;
the conveyor belt controller retrieving 104 the position of the item 2 at the first time instant $t_1$ before the first and second antennas and at the second time instant $t_2$ after the first and second antennas, the first and second time instants $t_1$, $t_2$ defining a time window W;

the reader associating 105 the tag 5 to the item 2 if at least one reading 6 has been retrieved from the second antenna for the tag 5 within the time window W; otherwise, the reader performing 106 a data processing of the phase measurements 6, which data processing comprises constructing 107 the phase curve 7 from the phase measurements 6 and determining 108 the global maximum 8 on the phase curve 7, and the reader associating 109 the tag 5 to the item 2 if the global maximum 8 lies within the time window W; whereby the identification of the item 2 is accomplished.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of identification of an item in a system, the system comprising
    a conveyor belt,
    a reader comprising a first antenna, the first antenna being arranged at a read point along the conveyor belt and configured for receiving a signal transmitted from a tag, the reader being operable to receive at least one reading from the tag via the first antenna; wherein the reader is configured to extract from each reading retrieved by the first antenna a measurement of the phase of the signal transmitted by the tag;
    a conveyor belt controller configured to retrieve a first position of the item at a first time instant $t_1$ before the first antenna and a second position of the item at a second time instant $t_2$ after the first antenna, the first and second time instants $t_1$, $t_2$ defining a time window W,
wherein the method comprises:
    placing an item on the conveyor belt;
    by the conveyor belt controller retrieving a first position of the item on the conveyor at the first time instant $t_1$ before the read point of the first antenna and a second position of the item on the conveyor at the second time instant $t_2$ after the read point of the first antenna, the first and second time instants $t_1$, $t_2$ defining a time window W;
    by the reader receiving readings from the tag via the first antenna;
    by the reader extracting, from each reading, a measurement of the phase of the signal transmitted by the tag;
    by the reader or by a local server performing a data processing of the phase measurements, which data processing comprises constructing a phase curve from the phase measurements, the phase curve expressing the signal phase in dependence of time, and determining a global maximum on the phase curve;
    by the reader associating the tag to the item if the global maximum lies within the time window W whereby the identification of the item is accomplished;
    wherein the reader further comprises at least one second antenna placed underneath an upper surface of the conveyor belt, the second antenna being displaced from the read point; wherein the method further includes:
    determining a time offset, the time offset corresponding to the time it takes for the conveyor belt to convey an item on the conveyor belt from the first antenna to the second antenna;
    determining a further time window that is offset by the time offset; and
    by the reader associating the tag to the item if at least one reading has been retrieved from the second antenna for the tag within the further time window.

2. The method according to claim 1, wherein the method further comprises constructing the phase curve by detecting period roll overs of the phase measurements and adding period fragments.

3. The method according to claim 1, wherein the method further comprises comparing the speed related to consecutive constructed phase measurements to the speed of the conveyor belt and accordingly filtering out constructed phase measurements not matching the movement pattern of the item.

4. The method according to claim 1, wherein the method further comprises verifying the global maximum by defining an interval along the constructed phase curve around the global maximum, calculating a decline before and after the global maximum, and comparing the calculated declines to a threshold.

5. The method according to claim 1, wherein the tag is an RFID tag, and the first antenna is an RFID antenna, and wherein the method comprises transmitting signals by the tag and reading the signals by the antenna.

6. The method according to claim 1, wherein the method comprises providing a reading that comprises a timestamp for receipt of the signal from the tag, a signal strength indicator (RSSI) for the signal, the signal phase value of the signal, and information about a communication channel for the signal.

7. The method according to claim 6, wherein the method comprises providing a signal strength threshold and discarding phase measurements when a received signal has a strength under the signal strength threshold.

8. The method according to claim 1, wherein the item is a suitcase, or a bag, or a package, and the method comprises identifying the item in an airport.

* * * * *